Patented Jan. 10, 1928.

1,656,120

UNITED STATES PATENT OFFICE.

FRITZ KEMPTER, OF STUTTGART, GERMANY.

PRODUCTION OF VISCOSE.

No Drawing. Application filed August 25, 1924, Serial No. 734,027, and in Germany May 14, 1924.

My invention refers to the art of making artificial fibres such as artificial silk and more particularly to the production of viscose for use in this manufacture. It is an object of the present invention to improve the preparation of the viscose with a view to rendering the process more efficient and to obtaining a product of higher quality than was hitherto possible.

As is well known to those skilled in the art, when producing viscose, the xanthate required therefor is as a rule prepared in such manner that the aged alkali cellulose is saturated with carbon disulfide in the mixing drum, the carbon disulfide and volatile carbon disulfide compounds in excess being sucked off from the drum at the end of the operation, whereupon the xanthate obtained is dissolved in a separate stirring apparatus by means of dilute caustic soda to form a viscose of the required concentration.

Experience has shown that in the xanthate thus produced, which leaves the mixing drum in the form of smaller or larger nodules, there are enclosed, besides supersaturated cellulose particles, also such particles which are only imperfectly saturated with carbon disulfide. Inasmuch as the carbon disulfide in excess had before been removed, these particles will remain insoluble during the dissolving treatment, which follows the saturation process, and will influence very unfavorably the filtration process by clogging the filters. On the other hand those particles of cellulose enclosed within the crumbs and nodules of the xanthate during the sucking off, which carry carbon disulfide in excess, when undergoing dissolving treatment, will give off this carbon disulfide to the viscose solution which is also undesirable.

In the process according to the present invention these drawbacks are obviated by slowly dissolving the xanthate in the dilute caustic soda under permanent vigorous kneading in the presence of the carbon disulfide which is still uncombined, before removing the carbon disulfide in excess. If the process is carried out in this manner, there is first formed a tough paste which permits the carbon disulfide in excess which is liberated from the cellulose particles by the vigorous kneading and friction to enter those cellulose particles which were not fully saturated and to completely dissolve them. Obviously by thus proceeding all the cellulose particles are subjected to the action of the carbon disulfide. Only after continued kneading and after the desired degree of dilution has been attained, the residue of free carbon disulfide and volatile compounds, which may still be present, is sucked off from the viscose under permanent stirring and a viscose solution is obtained which is substantially free of non-dissolved cellulose and of non-combined carbon disulfide and therefore constitutes a decided improvement upon similar products hitherto obtained.

In carrying the novel method into practice I prefer using a strong kneading machine permitting sucking-off in vacuo and in which the entire process of thionation, dissolving and suction can be carried through.

I wish it to be understood that I do not desire to be limited to the exact details of operation and construction above described, as obvious modifications will occur to a person skilled in the art.

I claim:—

The process of producing viscose solution comprising saturating matured alkali-cellulose with carbon disulfide, kneading the xanthate thus obtained with caustic soda solution and water in the presence of an excess of carbon disulfide and other volatile compounds which have not combined with the cellulose and then only, freeing the viscose solution thus obtained from the volatile constituents.

In testimony whereof I affix my signature.

FRITZ KEMPTER.